US011224902B2

(12) United States Patent
Robertson, Jr. et al.

(10) Patent No.: US 11,224,902 B2
(45) Date of Patent: Jan. 18, 2022

(54) SENSOR ASSEMBLY WITH CLEANING (71) Applicant: Ford Global Technologies, LLC, Dearborn, MI (US)

(72) Inventors: Michael Robertson, Jr., Garden City, MI (US); Ashwin Arunmozhi, Canton, MI (US); Venkatesh Krishnan, Canton, MI (US); Segundo Baldovino, Novi, MI (US); Rashaun Phinisee, Ypsilanti Township, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 354 days.

(21) Appl. No.: 16/400,660

(22) Filed: May 1, 2019

(65) Prior Publication Data
US 2020/0346255 A1 Nov. 5, 2020

(51) Int. Cl.
*G02B 27/00* (2006.01)
*B08B 7/02* (2006.01)
*B06B 1/06* (2006.01)
*B60S 1/56* (2006.01)

(52) U.S. Cl.
CPC .............. *B08B 7/02* (2013.01); *B06B 1/0633* (2013.01); *B60S 1/56* (2013.01); *G02B 27/0006* (2013.01); *G02B 27/00* (2013.01)

(58) Field of Classification Search
CPC ..... B60S 1/56; B08B 7/02; B08B 7/00; B06B 1/0633; B06B 1/06; G02B 27/0006; G02B 27/00
USPC ........................................................ 359/507
See application file for complete search history.

(56) References Cited

U.S. PATENT DOCUMENTS

| | | | |
|---|---|---|---|
| 5,910,700 A * | 6/1999 | Crotzer | G01N 29/036 310/338 |
| 7,486,326 B2 | 2/2009 | Ito et al. | |
| 7,492,408 B2 | 2/2009 | Ito | |
| 7,969,500 B2 * | 6/2011 | Urakami | G02B 27/0006 348/335 |
| 8,011,837 B2 * | 9/2011 | Kawai | G03B 19/12 396/439 |
| 8,075,143 B2 * | 12/2011 | Fujimoto | H04N 1/1013 359/507 |
| 8,089,554 B2 * | 1/2012 | Hamano | G03B 17/02 348/335 |
| 8,125,120 B2 | 2/2012 | Okazaki | |
| 8,253,838 B2 * | 8/2012 | Kawai | G03B 17/02 348/335 |
| 8,269,877 B2 | 9/2012 | Kitaoka | |
| 8,339,510 B2 * | 12/2012 | Miyazawa | H04N 5/232 348/375 |

(Continued)

*Primary Examiner* — William R Alexander
(74) *Attorney, Agent, or Firm* — Frank A. MacKenzie; Bejin Bieneman PLC (57) ABSTRACT

A system includes a sensor window, a sensor having a field of view through the sensor window, a piezoelectric vibrator positioned to impart vibrations to the sensor window, and a computer communicatively coupled to the sensor and the piezoelectric vibrator. The computer is programmed to identify a type for an obstruction of the sensor window based on data from the sensor, and instruct the piezoelectric vibrator to vibrate the sensor window with vibrations having a vibration profile. The vibration profile has at least one of frequency or phase velocity chosen according to the identified type of obstruction.

20 Claims, 7 Drawing Sheets

(56) References Cited

U.S. PATENT DOCUMENTS

| | | | |
|---|---|---|---|
| 8,638,391 B2* | 1/2014 | Ji | H04N 5/2171 |
| | | | 348/374 |
| 8,686,618 B2 | 4/2014 | Ohashi et al. | |
| 8,899,761 B2 | 12/2014 | Tonar et al. | |
| 9,041,859 B2* | 5/2015 | Ji | H04N 5/2254 |
| | | | 348/374 |
| 9,083,864 B2 | 7/2015 | Reed | |
| 10,071,400 B2* | 9/2018 | Li | B08B 7/028 |
| 11,079,592 B2* | 8/2021 | Bretagnol | B08B 17/06 |
| 2007/0223966 A1* | 9/2007 | Fujimoto | H04N 1/00909 |
| | | | 399/123 |
| 2008/0297641 A1* | 12/2008 | Urakami | H04N 5/2171 |
| | | | 348/335 |
| 2009/0257123 A1* | 10/2009 | Okazaki | G02B 27/0006 |
| | | | 359/513 |
| 2010/0013962 A1* | 1/2010 | Hamano | H04N 5/2171 |
| | | | 348/241 |
| 2010/0158501 A1* | 6/2010 | Kawai | G03B 17/12 |
| | | | 396/448 |
| 2011/0073142 A1* | 3/2011 | Hattori | B60S 1/56 |
| | | | 134/56 R |
| 2011/0317264 A1* | 12/2011 | Matsumoto | H04N 5/22521 |
| | | | 359/508 |
| 2012/0050609 A1* | 3/2012 | Ji | H04N 5/2253 |
| | | | 348/374 |
| 2012/0243093 A1* | 9/2012 | Tonar | G03B 17/08 |
| | | | 359/507 |
| 2014/0132821 A1* | 5/2014 | Ji | H04N 5/2171 |
| | | | 348/342 |
| 2017/0361360 A1* | 12/2017 | Li | B08B 7/028 |
| 2019/0162953 A1* | 5/2019 | Bretagnol | G02B 27/0006 |

* cited by examiner

SENSOR ASSEMBLY WITH CLEANING

BACKGROUND

Vehicles, such as autonomous or semi-autonomous vehicles, typically include a variety of sensors. Some sensors detect internal states of the vehicle, for example, wheel speed, wheel orientation, and engine and transmission variables. Some sensors detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back. Some sensors are communications devices, for example, vehicle-to-infrastructure (V2I) or vehicle-to-vehicle (V2V) devices.

Dirt, dust, moisture, and other types of debris can obstruct sensors. Some strategies for cleaning sensors include blowing air, spraying washer fluid, and applying a wiper blade. All these strategies, at least temporarily, further obstruct the sensor. Moreover, under at least some weather conditions, cleaning the sensor will need to occur regularly, which can be a drain on the power supply.

DETAILED DESCRIPTION

The system described herein provides a solution for keeping a sensor clean without temporarily obstructing the sensor and in an energy-efficient manner. Piezoelectric vibrators are used to vibrate obstructions off of a sensor window of the sensor. The piezoelectric vibrators can be located permanently outside a field of vision of the sensor, or the piezoelectric vibrators can be transparent with respect to a medium that the sensor is capable of detecting. Moreover, multiple piezoelectric vibrators can be coupled to one sensor window, and the piezoelectric vibrators can be activated with different frequencies and/or phase velocities than each other based on the location of the obstruction, allowing a reduced energy expenditure compared with activating all the piezoelectric vibrators at the same frequency and phase velocity. The effectiveness of the piezoelectric vibrators on removing an obstruction can be measured, and a different frequency or phase velocity can be used for the same type of obstruction the next time that it occurs, further optimizing energy consumption.

A system includes a sensor window, a sensor having a field of view through the sensor window, a piezoelectric vibrator positioned to impart vibrations to the sensor window, and a computer communicatively coupled to the sensor and the piezoelectric vibrator. The computer is programmed to identify a type for an obstruction of the sensor window based on data from the sensor, and instruct the piezoelectric vibrator to vibrate the sensor window with vibrations following a vibration profile. The vibration profile has at least one of frequency or phase velocity chosen according to the identified type of obstruction.

The piezeoelectric vibrator may be a first piezoelectric vibrator, and the system may further include a second piezoelectric vibrator positioned to impart vibrations to the sensor window. The computer may be programmed to instruct the piezoelectric vibrators to vibrate the sensor window with vibrations following vibration profiles having at least one of different frequencies or different phase velocities chosen according to the identified type of obstruction.

The system may further include a third piezoelectric vibrator positioned to impart vibrations to the sensor window, and a fourth piezoelectric vibrator positioned to impart vibrations to the sensor window. The piezoelectric vibrators may be circumferentially evenly spaced around the sensor window.

The computer may be programmed to determine an effectiveness metric for removing the obstruction based on data from the sensor during or after the piezoelectric vibrator was vibrating. The computer may be programmed to determine at least one of a new frequency or new phase velocity based on the effectiveness metric, and instruct the piezoelectric vibrator to vibrate the sensor window with vibrations following a vibration profile having the at least one new frequency or new phase velocity upon identifying a type of a new obstruction that is the same type of obstruction as for the effectiveness metric.

The system may further include an annular sensor-window frame in which the sensor window is mounted. The sensor may include a sensor housing, and the system may further include an annular dampener coupling the sensor-window frame to the sensor housing. The sensor may include a sensor lens mounted to the sensor housing and defining an axis, and the sensor lens may be closer to the sensor window along the axis than the dampener is.

The piezoelectric vibrator may be piezoelectric paint directly coating the sensor window. The sensor window may be a lens for the sensor.

A computer includes a processor and a memory storing instructions executable by the processor to identify a type for an obstruction of a sensor window based on data from a sensor having a field of view through the sensor window, and instruct a piezoelectric vibrator to vibrate the sensor window with vibrations following a vibration profile. The vibration profile has at least one of frequency or phase velocity chosen according to the identified type of obstruction.

The piezoelectric vibrator may be a first piezoelectric vibrator, and the instructions may further include to instruct the first piezoelectric vibrator and a second piezoelectric vibrator to vibrate the sensor window with vibrations following vibration profiles having at least one of different frequencies or different phase velocities chosen according to the identified type of obstruction.

The instructions may further include to determine an effectiveness metric for removing the obstruction based on data from the sensor during or after the piezoelectric vibrator was vibrating. The instructions may further include to determine at least one of a new frequency or new phase velocity based on the effectiveness metric, and instruct the piezoelectric vibrator to vibrate the sensor window with vibrations following a vibration profile having the at least one new frequency or new phase velocity upon identifying a type of a new obstruction that is the same type of obstruction as for the effectiveness metric.

A method includes identifying a type for an obstruction of a sensor window based on data from a sensor having a field of view through the sensor window, and instructing a piezoelectric vibrator to vibrate the sensor window with vibrations following a vibration profile. The vibration profile has at least one of frequency or phase velocity chosen according to the identified type of obstruction.

The piezoelectric vibrator may be a first piezoelectric vibrator, the method may further include instructing the first piezoelectric vibrator and a second piezoelectric vibrator to vibrate the sensor window with vibrations following vibration profiles having at least one of different frequencies or different phase velocities chosen according to the identified type of obstruction.

The method may further include determining an effectiveness metric for removing the obstruction based on data from the sensor during or after the piezoelectric vibrator was vibrating. The method may further include determining at least one of a new frequency or new phase velocity based on the effectiveness metric, and instructing the piezoelectric vibrator to vibrate the sensor window with vibrations following a vibration profile having the at least one new frequency or new phase velocity upon identifying a type of a new obstruction that is the same type of obstruction as for the effectiveness metric.

A system 32 for a vehicle 30 includes a sensor window 34, a sensor 36 having a field of view through the sensor window 34, at least one piezoelectric vibrator 38 positioned to impart vibrations to the sensor window 34, and a computer 40 communicatively coupled to the sensor 36 and the piezoelectric vibrator 38. The computer 40 is programmed to identify a type for an obstruction of the sensor window 34 based on data from the sensor 36, and instruct the piezoelectric vibrators 38 to vibrate the sensor window 34 with vibrations following a vibration profile. The vibration profile has at least one of frequency or phase velocity chosen according to the identified type of obstruction.

Figure 1:
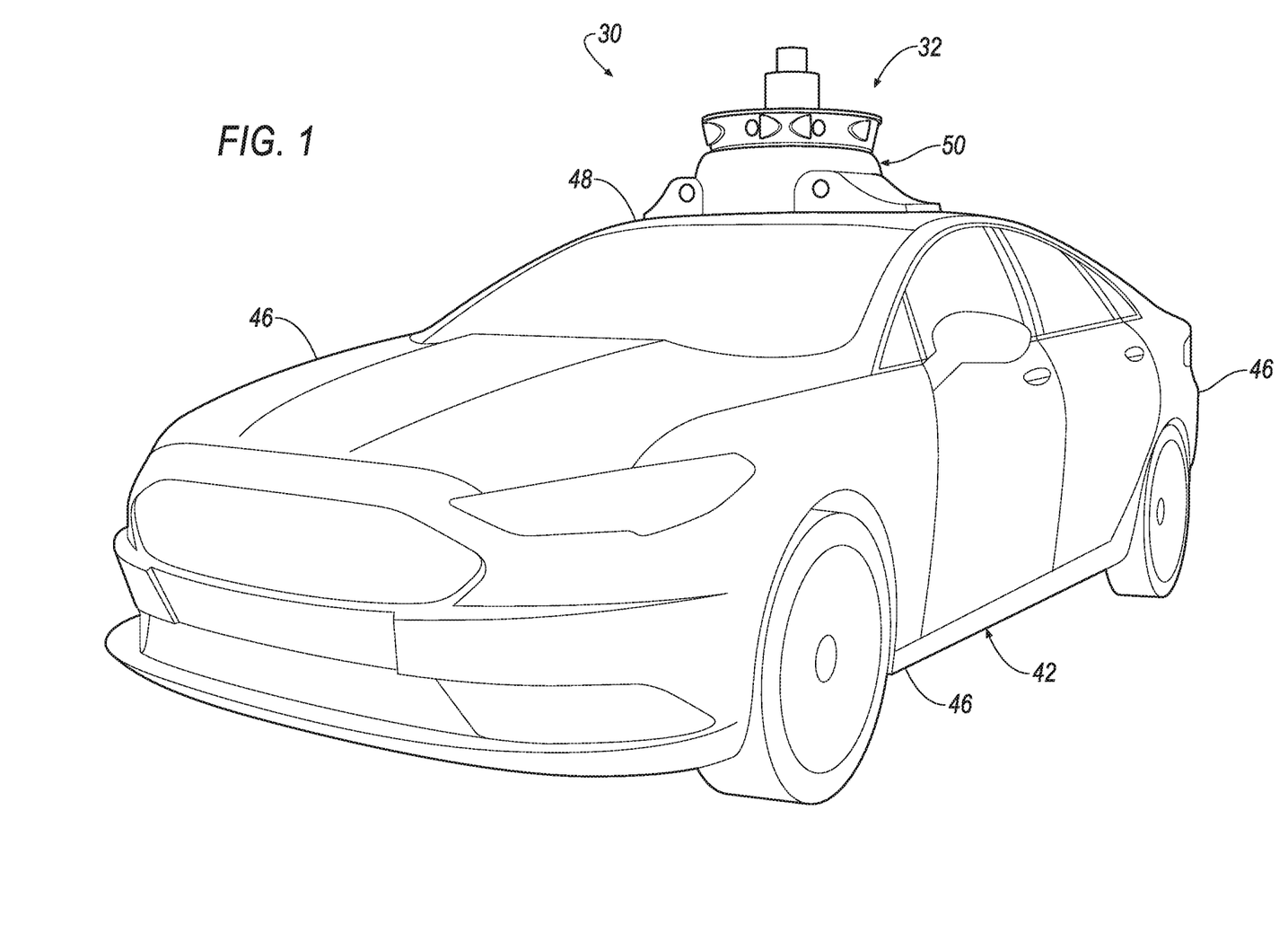
FIG. 1 is a perspective view of an example vehicle including a housing for sensors.

With reference to FIG. 1, the vehicle 30 may be any passenger or commercial automobile such as a car, a truck, a sport utility vehicle, a crossover, a van, a minivan, a taxi, a bus, etc.

The vehicle 30 may be an autonomous vehicle. A computer can be programmed to operate the vehicle 30 independently of the intervention of a human driver, completely or to a lesser degree. The computer may be programmed to operate the propulsion, brake system, steering, and/or other vehicle systems based at least in part on data received from the sensor 36. For the purposes of this disclosure, autonomous operation means the computer controls the propulsion, brake system, and steering without input from a human driver; semi-autonomous operation means the computer controls one or two of the propulsion, brake system, and steering and a human driver controls the remainder; and nonautonomous operation means a human driver controls the propulsion, brake system, and steering.

The vehicle 30 includes a body 42. The vehicle 30 may be of a unibody construction, in which a frame and the body 42 of the vehicle 30 are a single component. The vehicle 30 may, alternatively, be of a body-on-frame construction, in which the frame supports the body 42 that is a separate component from the frame. The frame and body 42 may be formed of any suitable material, for example, steel, aluminum, etc.

The body 42 includes body panels 46, 48 partially defining an exterior of the vehicle 30. The body panels 46, 48 may present a class-A surface, e.g., a finished surface exposed to view by a customer and free of unaesthetic blemishes and defects. The body panels 46, 48 include, e.g., a roof 48, etc.

A housing 50 for the sensors 36 is attachable to the vehicle 30, e.g., to one of the body panels 46, 48 of the vehicle 30, e.g., the roof 48. For example, the housing 50 may be shaped to be attachable to the roof 48, e.g., may have a shape matching a contour of the roof 48. The housing 50 may be attached to the roof 48, which can provide the sensors 36 with an unobstructed field of view of an area around the vehicle 30. The housing 50 may be formed of, e.g., plastic or metal.

The sensors 36 may detect the external world, e.g., objects and/or characteristics of surroundings of the vehicle 30, such as other vehicles, road lane markings, traffic lights and/or signs, pedestrians, etc. For example, the sensors 36 may include radar sensors, scanning laser range finders, light detection and ranging (LIDAR) devices, and image processing sensors such as cameras. Each of the sensors 36 has a field of view, i.e., a region projected through space from which the sensor 36 receives stimuli. In particular, the sensors 36 may be cameras arranged to collectively cover a 360° horizontal field of view.

The sensors 36 may be attached directly to the roof 48 inside the housing 50, or the sensors 36 may be attached to the housing 50, which in turn is directly attached to the roof 48, while being disposed inside the housing 50. The rest of this disclosure refers to a single sensor 36, which could be any of the sensors 36.

Figure 2:
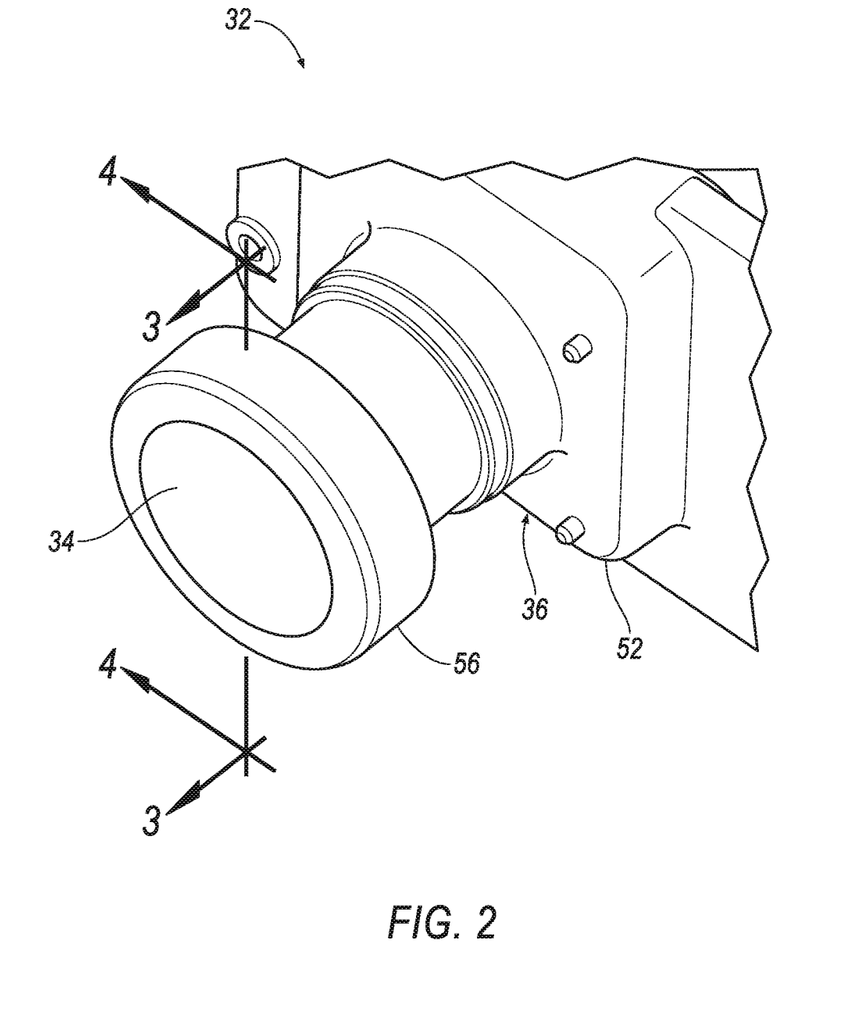
FIG. 2 is a perspective view of a sensor assembly in the housing.
Figure 5:
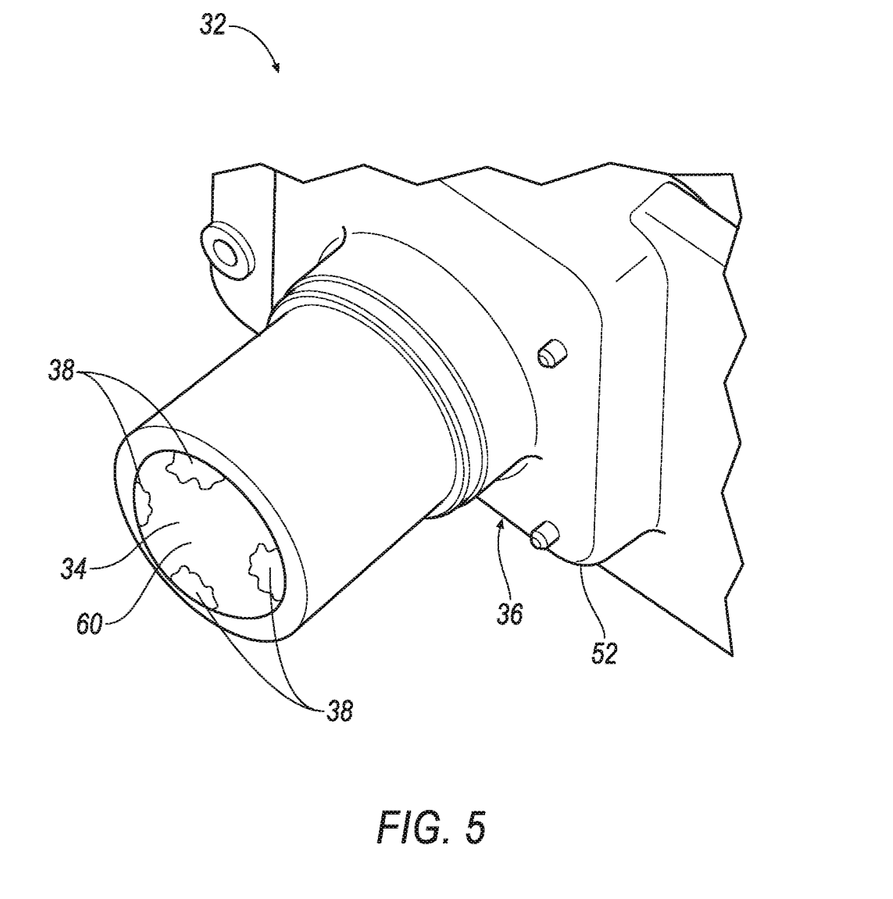
FIG. 5 is a perspective view of another example sensor assembly.

With reference to FIGS. 2 and 5, the sensor 36 includes a sensor housing 52 fixed relative to the housing 50. The sensor housing 52 is attached, e.g., fastened, to the housing 50. The sensor housing 52 encloses and protects operational components of the sensor 36.

The sensor 36 has a field of view through the sensor window 34. The sensor window 34 is fixed relative to and mounted to the sensor housing 52. Along with the sensor housing 52, the sensor window 34 encloses and protects operational components of the sensor 36. The sensor window 34 is transparent with respect to a medium that the sensor 36 is capable of detecting, e.g., visible light. For example, the sensor window 34 can be, e.g., safety glass, i.e., two layers of glass attached to a vinyl layer; polycarbonate, etc.

Figure 3:
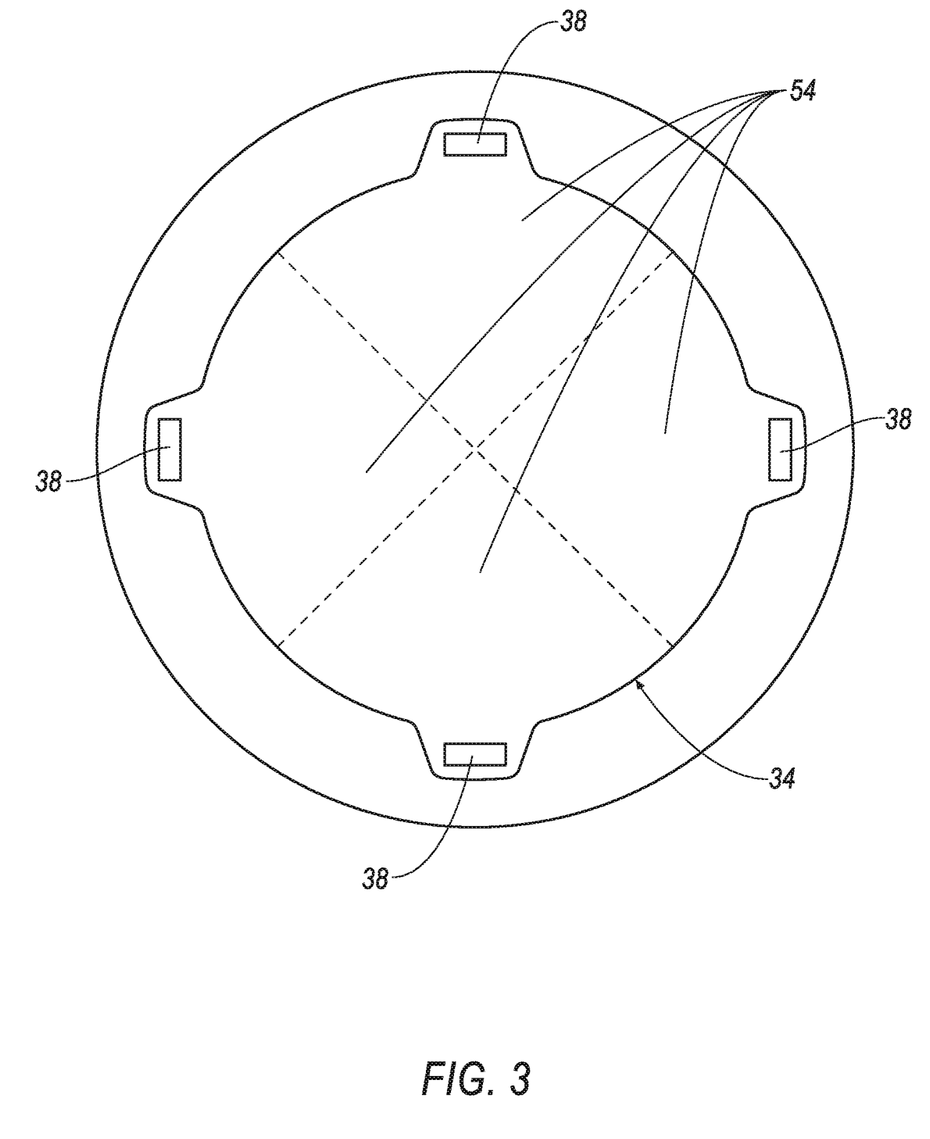
FIG. 3 is a front cross-sectional view of the sensor assembly through line 3-3 of FIG. 2.

With reference to FIGS. 3 and 5, the piezoelectric vibrators 38 use the piezoelectric effect to convert electrical energy to mechanical motion. In a piezoelectric material, mechanical stress causes the material to generate electricity, and vice versa. Examples of piezoelectric materials include some ceramics such as lead zirconate titanate (PZT), and single-crystal materials such as gallium phosphate and tourmaline. Transmitting a fluctuating electrical signal to the piezoelectric vibrators 38 causes the piezoelectric vibrators 38 to vibrate.

The piezoelectric vibrators 38 are positioned to impart vibrations to the sensor window 34. For example, the piezoelectric vibrators 38 are fixedly attached to the sensor window 34 such that vibration of the piezoelectric vibrators 38 causes vibration of the sensor window 34 at the position of attachment, which can then propagate through the sensor window 34. Multiple piezoelectric vibrators 38 can be attached to one sensor window 34. For example, four piezoelectric vibrators 38 can be attached to the sensor window 34. The plurality of piezoelectric vibrators 38 can be evenly circumferentially spaced around the sensor window 34. The sensor window 34 includes a plurality of regions 54, with each region 54 being the portion of the sensor window 34 closest to a respective piezoelectric vibrator 38.

Each piezoelectric vibrator 38 vibrates the sensor window 34 with vibrations following a vibration profile. For the purposes of this disclosure, a "vibration profile" is defined as a set of values fully defining a periodic function that the vibrations follow. The vibration profile can include, e.g., frequency, phase velocity, amplitude, etc. For the purposes of this disclosure, "frequency" is defined as a number of cycles per unit time, and "phase velocity" is defined as a rate at which a phase of a wave propagates through space. The piezoelectric vibrators 38 can adjust the vibration profiles of the vibrations imparted to the sensor window 34. At any given time, the piezoelectric vibrators 38 can all have the same vibration profile or can have different vibration profiles.

Figure 4:
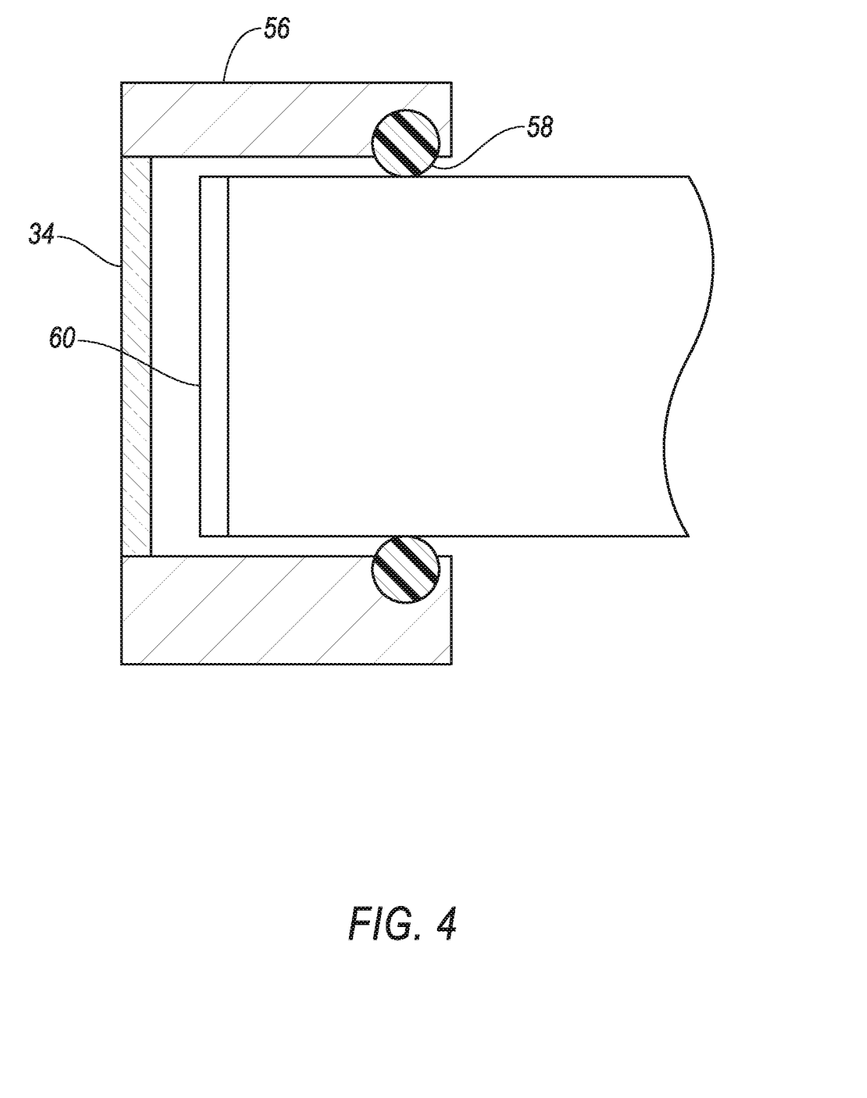
FIG. 4 is a side cross-sectional view of the sensor assembly through line 4-4 of FIG. 2.

FIGS. 2-4 illustrate a first embodiment of the system 32. The system 32 in the first embodiment includes an annular sensor-window frame 56 in which the sensor window 34 is mounted, an annular dampener 58 coupling the sensor-window frame 56 to the sensor housing 52, and a sensor lens 60 separate from the sensor window 34.

With reference to FIG. 3, in the first embodiment, the piezoelectric vibrators 38 can be transducers or actuators attached to the sensor window 34. For example, the piezoelectric vibrators 38 can be attached on a surface of the sensor window 34. For another example, the piezoelectric vibrators 38 can be embedded in the sensor window 34, e.g., molded in the sensor window 34 if the sensor window 34 is formed of polycarbonate, or between the two glass layers along with the vinyl layer if the sensor window 34 is formed of safety glass. The piezoelectric vibrators 38 can be positioned radially outside a portion of the sensor window 34 encompassed by the field of view of the sensor 36.

With reference to FIGS. 2 and 4, in the first embodiment, the sensor-window frame 56 extends circumferentially around the sensor lens 60. The sensor-window frame 56 has an annular shape extending around an axis A defined by the sensor lens 60. The sensor-window frame 56 has an inside diameter greater than a diameter of the sensor lens 60.

With reference to FIG. 4, in the first embodiment, the dampener 58 couples the sensor-window frame 56 to the sensor housing 52. The dampener 58 has an annular shape extending around the axis A. The dampener 58 is a material that dampens vibrations from the piezoelectric vibrators 38 so that the vibrations are not transmitted from the sensor window 34 to the sensor 36. The dampener 58 may be, e.g., foam with a Shore hardness value chosen to absorb vibrations of the range of frequencies generated by the piezoelectric vibrators 38.

In the first embodiment, the sensor lens 60 is mounted to the sensor housing 52. The sensor lens 60 is transparent with respect to a medium that the sensor 36 is capable of detecting, e.g., visible light. The sensor lens 60 bends light traveling from within the field of view to the sensor 36, and the curvature of the sensor lens 60 can define the field of view of the sensor 36. The sensor lens 60 is closer to the sensor window 34 along the axis A than the dampener 58 is.

FIG. 5 illustrates a second embodiment of the system 32. In the second embodiment, the sensor window 34 is the sensor lens 60, and the piezoelectric vibrators 38 are piezoelectric paint directly coating the sensor window 34.

In the second embodiment, the piezoelectric vibrators 38 are made of piezoelectric paint. The piezoelectric paint is spreadable, sprayable, etc. onto an irregularly shaped surface, such as the curved shape of the sensor lens 60. The piezoelectric paint can be, e.g., a composite of a piezoelectric ceramic and a polymer, e.g., PZT mixed as a pigment into epoxy resin as a binder. The components of the piezoelectric paint can be chosen so that the piezoelectric paint is transparent with respect to a medium that the sensor 36 is capable of detecting, e.g., visible light In the second embodiment, the sensor window 34 and the sensor lens 60 are the same component. Along with the sensor housing 52, the sensor window 34 encloses and protects operational components of the sensor 36. The sensor window 34 is transparent with respect to a medium that the sensor 36 is capable of detecting, e.g., visible light. The sensor window 34 bends light traveling from within the field of view to the sensor 36, and the curvature of the sensor window 34 can define the field of view of the sensor 36.

Figure 6:
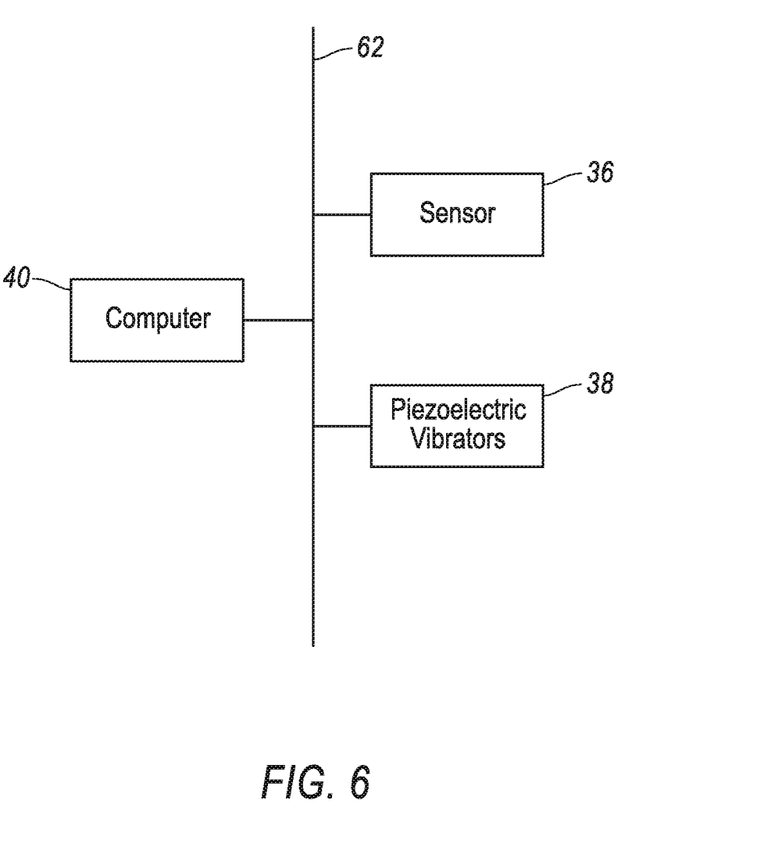
FIG. 6 is a diagram of a control system for the sensor assembly.

With reference to FIG. 6, the computer 40 is a microprocessor-based controller. The computer 40 includes a processor, a memory, etc. The memory of the computer 40 includes media for storing instructions executable by the processor as well as for electronically storing data and/or databases.

The computer 40 may transmit and receive data through a communications network 62 such as a controller area network (CAN) bus, Ethernet, WiFi, Local Interconnect Network (LIN), onboard diagnostics connector (OBD-II), and/or by any other wired or wireless communications network. The computer 40 may be communicatively coupled to the sensor 36, the piezoelectric vibrators 38, and other components via the communications network 62.

Figure 7:
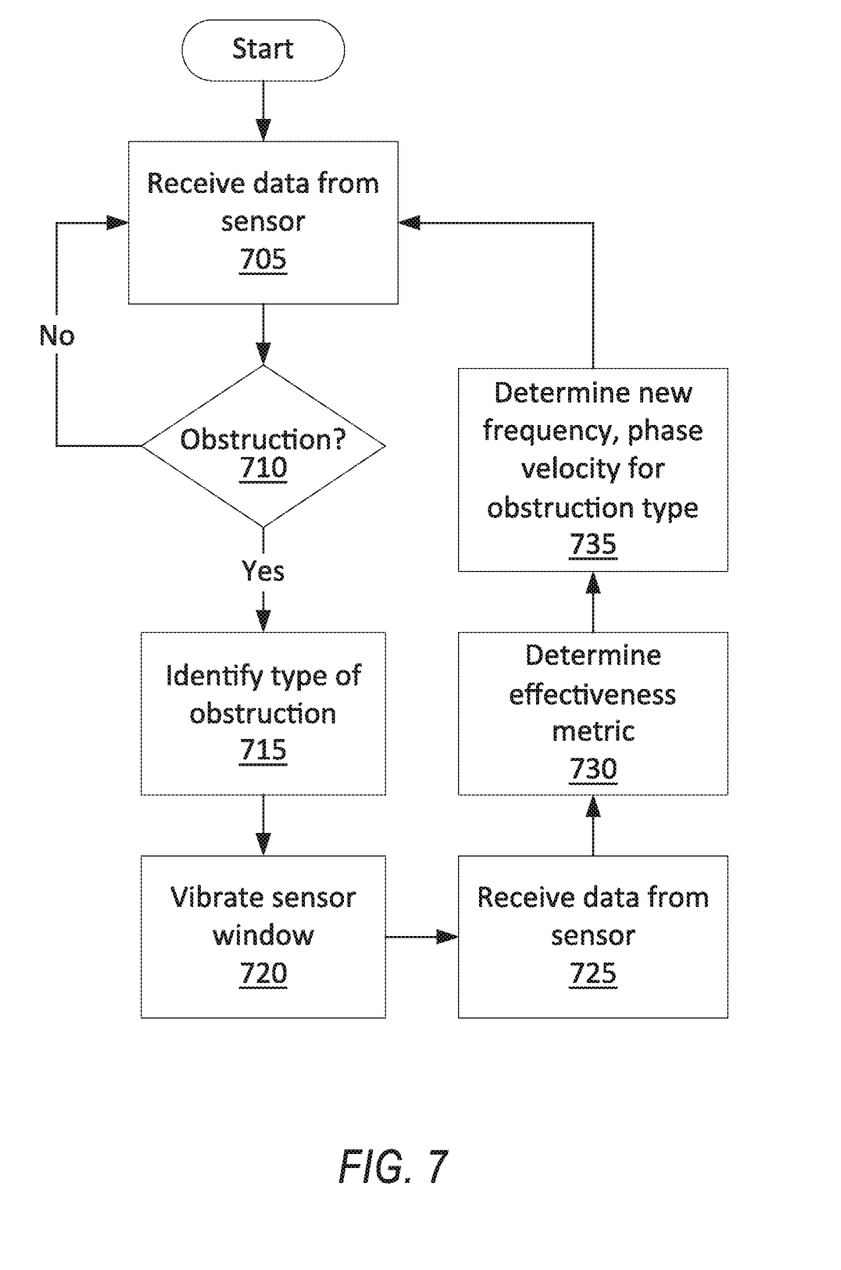
FIG. 7 is a process flow diagram of an example process for cleaning the sensor assembly.

FIG. 7 depicts a process flow diagram illustrating an exemplary process 700 for cleaning the sensor window 34. The memory of the computer 40 stores executable instructions for performing the steps of the process 700. As a general overview of the process 700, the computer 40 identifies a type of obstruction on the sensor window 34, vibrates the sensor window 34 with vibrations following a vibration profile having a prestored frequency and phase velocity using the piezoelectric vibrators 38, and stores a vibration profile with a new frequency and/or phase velocity for that type of obstruction based on the effectiveness of the vibration profile in removing the obstruction. For the purposes of this disclosure, a "type of obstruction" is defined as a qualitative classification of something obscuring input to the sensor 36. The types of obstructions can include, e.g., water, dirt, mud, dust, crushed insect, live insect, etc.

The process 700 begins in a block 705, in which the computer 40 receives data from the sensor 36. The computer 40 receives, e.g., image data from the sensor 36 through the communications network 62. The data are a sequence of image frames of the field of view of the sensor 36. Each image frame is a two-dimensional matrix of pixels. Each pixel has a brightness or color represented as one or more numerical values, depending on the type of sensor 36. For example, if the sensor 36 is a monochrome camera, each pixel can be a scalar unitless value of photometric light intensity between 0 (black) and 1 (white). For another example, if the sensor 36 is a full-color camera, the pixels can be values for each of red, green, and blue, e.g., each on an 8-bit scale (0 to 255) or a 12- or 16-bit scale. Position in an image frame, i.e., position in the field of view of the sensor 36 at the time that the image frame was recorded, can be specified in pixel dimensions or coordinates, e.g., an ordered pair of pixel distances, such as a number of pixels from a top edge and a number of pixels from a left edge of the field of view. Alternatively, the data from the sensor 36 can be event-based vision, in which each pixel records independently of the other pixels when that pixel senses motion, thus recording more extensively about portions of the field of view experiencing change and recording less about portions of the field of view remaining static.

Next, in a decision block 710, the computer 40 determines whether an obstruction trigger has occurred. An "obstruction trigger" is any data received in the computer 40 that indicates that the sensor window 34 should be cleaned. For example, the computer 40 may receive a user command to perform cleaning of the sensor window 34 or of another component of the vehicle 30 such as a windshield. For another example, the computer 40 may determine that debris is on the sensor window 34 based on data received from the sensor 36. For example, the computer 40 may determine, e.g., according to known image-analysis techniques, that a set of pixels in image data received from the sensor 36 is unchanging over time compared to the other of the pixels in the image data, suggesting that a portion of the field of view of the sensor 36 has been covered. Other algorithms may be used, e.g., classical computer vision or machine learning algorithms such as convolutional neural networks. In response to the lack of an obstruction trigger, the process 700 returns to the block 705 to continue monitoring for obstructions. In response to an obstruction trigger, the process 700 proceeds to a block 715.

In the block 715, the computer 40 identifies the type of obstruction of the sensor window 34 based on the data received from the sensor 36 in the block 705. The computer 40 can identify the type of obstruction using conventional image-recognition techniques, e.g., a convolutional neural network programmed to accept images as input and output an identified type of obstruction. The types of obstructions can include, e.g., water, dirt, mud, dust, crushed insect, live insect, etc. A convolutional neural network includes a series of layers, with each layer using the previous layer as input. Each layer contains a plurality of neurons that receive as input data generated by a subset of the neurons of the previous layers and generate output that is sent to neurons in the next layer. Types of layers include convolutional layers, which compute a dot product of a weight and a small region of input data; pool layers, which perform a downsampling operation along spatial dimensions; and fully connected layers, which generate based on the output of all neurons of the previous layer. The final layer of the convolutional neural network generates a score for each potential type of obstruction, and the final output is the type of obstruction with the highest score.

Next, in a block 720, the computer 40 instructs the piezoelectric vibrators 38 to vibrate the sensor window 34 with vibrations following a vibration profile having frequencies and/or phase velocities chosen according to the identified type of obstruction. The computer 40 may instruct the piezoelectric vibrators 38 to vibrate the sensor window 34 with different frequencies or different phase velocities chosen according to the identified type of obstruction. For example, the piezoelectric vibrators 38 in regions 54 of the sensor window 34 in which the obstruction has been detected can vibrate with a greater frequency or faster phase velocity than the piezoelectric vibrators 38 in regions 54 of the sensor window 34 in which the obstruction is absent. The memory of the computer 40 can store a lookup table of frequencies, phase velocities, and durations paired with types of obstructions, e.g., the following table:

| Type of Obstruction | Region with Obstruction | | Region without Obstruction | | Duration [s] |
|---|---|---|---|---|---|
| | Frequency [kHz] | Phase Velocity [m/s] | Frequency [kHz] | Phase Velocity [m/s] | |
| Water | 20 | 2000 | 15 | 1000 | 2 |
| Dirt | 10 | 4000 | 8 | 2000 | 1 |
| Mud | 30 | 6000 | 20 | 4000 | 3 |
| Dust | 10 | 4000 | 5 | 1500 | 2 |
| Crushed insect | 65 | 6000 | 40 | 3000 | 3 |
| Live insect | 5 | 5000 | 0 | 0 | 0.5 |

For example, in response to the type of obstruction being dirt in a topmost region 54 of the sensor window 34 with the rest of the sensor window 34 being unobstructed, the computer 40 instructs the piezoelectric vibrator 38 for the topmost region 54 to vibrate following a vibration profile having a frequency of 10 kHz and a phase velocity of 4000 m/s, and the computer 40 instructs the piezoelectric vibrators 38 for the other regions 54 to vibrate following a vibration profile having a frequency of 8 kHz and a phase velocity of 2000 m/s; the piezoelectric vibrators 38 vibrate the sensor window 34 with the chosen frequencies and phase velocities for 1 second and then stop.

Next, in a block 725, the computer 40 receives data from the sensor 36, as described above with respect to the block 705, from a time period during and/or immediately after the piezoelectric vibrators 38 have ceased vibrating.

Next, in a block 730, the computer 40 determines an effectiveness metric for removing the obstruction based on the data received in the block 725. For the purposes of this disclosure, "effectiveness metric" is defined as a numerical measure representing how effectively the obstruction was removed from the sensor window 34. For example, the effectiveness metric can be a percentage reduction in area covered by the obstruction, i.e., $E=(A_1-A_2)/A_1$, in which E is the effectiveness metric, $A_1$ is the area of the sensor window 34 covered by the obstruction before vibrating the sensor window 34, and $A_2$ is the area of the sensor window 34 covered by the obstruction after vibrating the sensor window 34. For another example, the effectiveness metric can be a duration starting at the beginning of vibrating the sensor window 34 until the area covered by the obstruction is below a threshold. The threshold can be a percentage of the original area, e.g., 5% of the original area, i.e., $0.05A_1$; thus, the effectiveness metric is the amount of time t for the area covered by the obstruction to decrease from $A_1$ to $0.05A_1$. For another example, the effectiveness metric can be a combination of measurements, e.g., the percentage reduction in area for reductions less than 95%, and the amount of time to reduce the area to 5% of the original size for reductions greater than 95%.

Next, in a block 735, the computer 40 determines a new frequency, a new phase velocity, and/or a new duration based on the effectiveness metric. For example, if the effectiveness metric is below a threshold, the computer 40 determines a new frequency higher than the previous frequency, a new phase velocity faster than the previous phase velocity, and/or a new duration longer than the previous duration. The threshold can be unique to each type of obstruction or constant across different types of obstructions. The threshold can be chosen to meet operating requirements for the sensor 36. The new frequency, phase velocity, and/or duration can be stored in the table shown above with respect to the block 720, paired with the same type of obstruction as found in the decision block 710. Thus, the next time that the block 720 is executed after finding the same type of obstruction in the decision block 710, the computer 40 will instruct the piezoelectric vibrators 38 to vibrate the sensor window 34 following a vibration profile having the new frequency, phase velocity, and/or duration. After the block 735, the process 700 returns to the block 705 to continue monitoring for obstructions.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. The adjectives "first," "second," "third," and "fourth" are used throughout this document as identifiers and are not intended to signify importance or order.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system comprising:
   a sensor window;
   a sensor having a field of view through the sensor window;

a piezoelectric vibrator positioned to impart vibrations to the sensor window; and a computer communicatively coupled to the sensor and the piezoelectric vibrator;

wherein the computer is programmed to:

identify a type for an obstruction of the sensor window based on data from the sensor; and instruct the piezoelectric vibrator to vibrate the sensor window with vibrations following a vibration profile, the vibration profile having at least one of frequency or phase velocity chosen according to the identified type of obstruction.

2. The system of claim 1, wherein the piezoelectric vibrator is a first piezoelectric vibrator, the system further comprising a second piezoelectric vibrator positioned to impart vibrations to the sensor window.

3. The system of claim 2, wherein the computer is programmed to instruct the piezoelectric vibrators to vibrate the sensor window with vibrations following vibration profiles having at least one of different frequencies or different phase velocities chosen according to the identified type of obstruction.

4. The system of claim 2, further comprising a third piezoelectric vibrator positioned to impart vibrations to the sensor window, and a fourth piezoelectric vibrator positioned to impart vibrations to the sensor window.

5. The system of claim 4, wherein the piezoelectric vibrators are circumferentially evenly spaced around the sensor window.

6. The system of claim 1, wherein the computer is programmed to determine an effectiveness metric for removing the obstruction based on data from the sensor during or after the piezoelectric vibrator was vibrating.

7. The system of claim 6, wherein the computer is programmed to determine at least one of a new frequency or new phase velocity based on the effectiveness metric, and instruct the piezoelectric vibrator to vibrate the sensor window with vibrations following a vibration profile having the at least one new frequency or new phase velocity upon identifying a type of a new obstruction that is the same type of obstruction as for the effectiveness metric.

8. The system of claim 1, further comprising an annular sensor-window frame in which the sensor window is mounted.

9. The system of claim 8, wherein the sensor includes a sensor housing, the system further comprising an annular dampener coupling the sensor-window frame to the sensor housing.

10. The system of claim 9, wherein the sensor includes a sensor lens mounted to the sensor housing and defining an axis, wherein the sensor lens is closer to the sensor window along the axis than the dampener is.

11. The system of claim 1, wherein the piezoelectric vibrator is piezoelectric paint directly coating the sensor window.

12. The system of claim 11, wherein the sensor window is a lens for the sensor.

13. A computer comprising a processor and a memory storing instructions executable by the processor to:

identify a type for an obstruction of a sensor window based on data from a sensor having a field of view through the sensor window; and instruct a piezoelectric vibrator to vibrate the sensor window with vibrations following a vibration profile, the vibration profile having at least one of frequency or phase velocity chosen according to the identified type of obstruction.

14. The computer of claim 13, wherein the piezoelectric vibrator is a first piezoelectric vibrator, and the instructions further include to instruct the first piezoelectric vibrator and a second piezoelectric vibrator to vibrate the sensor window with vibrations following vibration profiles having at least one of different frequencies or different phase velocities chosen according to the identified type of obstruction.

15. The computer of claim 13, wherein the instructions further include to determine an effectiveness metric for removing the obstruction based on data from the sensor during or after the piezoelectric vibrator was vibrating.

16. The computer of claim 15, wherein the instructions further include to determine at least one of a new frequency or new phase velocity based on the effectiveness metric, and instruct the piezoelectric vibrator to vibrate the sensor window with vibrations following a vibration profile having the at least one new frequency or new phase velocity upon identifying a type of a new obstruction that is the same type of obstruction as for the effectiveness metric.

17. A method comprising:

identifying a type for an obstruction of a sensor window based on data from a sensor having a field of view through the sensor window; and instructing a piezoelectric vibrator to vibrate the sensor window with vibrations following a vibration profile, the vibration profile having at least one of frequency or phase velocity chosen according to the identified type of obstruction.

18. The method of claim 17, wherein the piezoelectric vibrator is a first piezoelectric vibrator, the method further comprising instructing the first piezoelectric vibrator and a second piezoelectric vibrator to vibrate the sensor window with vibrations following vibration profiles having at least one of different frequencies or different phase velocities chosen according to the identified type of obstruction.

19. The method of claim 17, further comprising determining an effectiveness metric for removing the obstruction based on data from the sensor during or after the piezoelectric vibrator was vibrating.

20. The method of claim 19, further comprising determining at least one of a new frequency or new phase velocity based on the effectiveness metric, and instructing the piezoelectric vibrator to vibrate the sensor window with vibrations following a vibration profile having the at least one new frequency or new phase velocity upon identifying a type of a new obstruction that is the same type of obstruction as for the effectiveness metric.

* * * * *